United States Patent [19]

Harbison et al.

[11] 4,075,731
[45] Feb. 28, 1978

[54] WINDSHIELD WIPER REFILL UNIT

[75] Inventors: William H. Harbison, Merrillville; Michael G. Mohnach, Valparaiso; John J. Plisky, Munster, all of Ind.

[73] Assignee: The Anderson Company, Gary, Ind.

[21] Appl. No.: 626,077

[22] Filed: Oct. 28, 1975

[51] Int. Cl.² .............................................. B60S 1/04
[52] U.S. Cl. ................................................. 15/250.42
[58] Field of Search ......................... 15/250.42, 250.36

[56] References Cited

U.S. PATENT DOCUMENTS

| | | | |
|---|---|---|---|
| 2,782,443 | 2/1957 | Krohm | 15/250.42 |
| 3,060,480 | 10/1962 | Ziegler | 15/250.42 |
| 3,153,254 | 10/1964 | Lenz et al. | 15/250.42 |
| 3,386,123 | 6/1968 | Oishei et al. | 15/250.36 X |
| 3,659,310 | 5/1972 | Rosen | 15/250.42 |
| 3,795,935 | 3/1974 | Roberts | 15/250.42 |

*Primary Examiner*—Richard E. Aegerter
*Assistant Examiner*—Richard R. Stearns
*Attorney, Agent, or Firm*—Wegner, Stellman, McCord, Wiles & Wood

[57] ABSTRACT

A backing strip of a wiper blade refill unit is provided with a narrower element engaging slot to reduce wiper element disengagement from the backing strip, with a greater width to reduce backing strip disengagement from the claws of the superstructure and with a retaining tab for positive engagement with a flat U-shaped end clip to eliminate accidental end clip separation from the backing strip.

2 Claims, 8 Drawing Figures

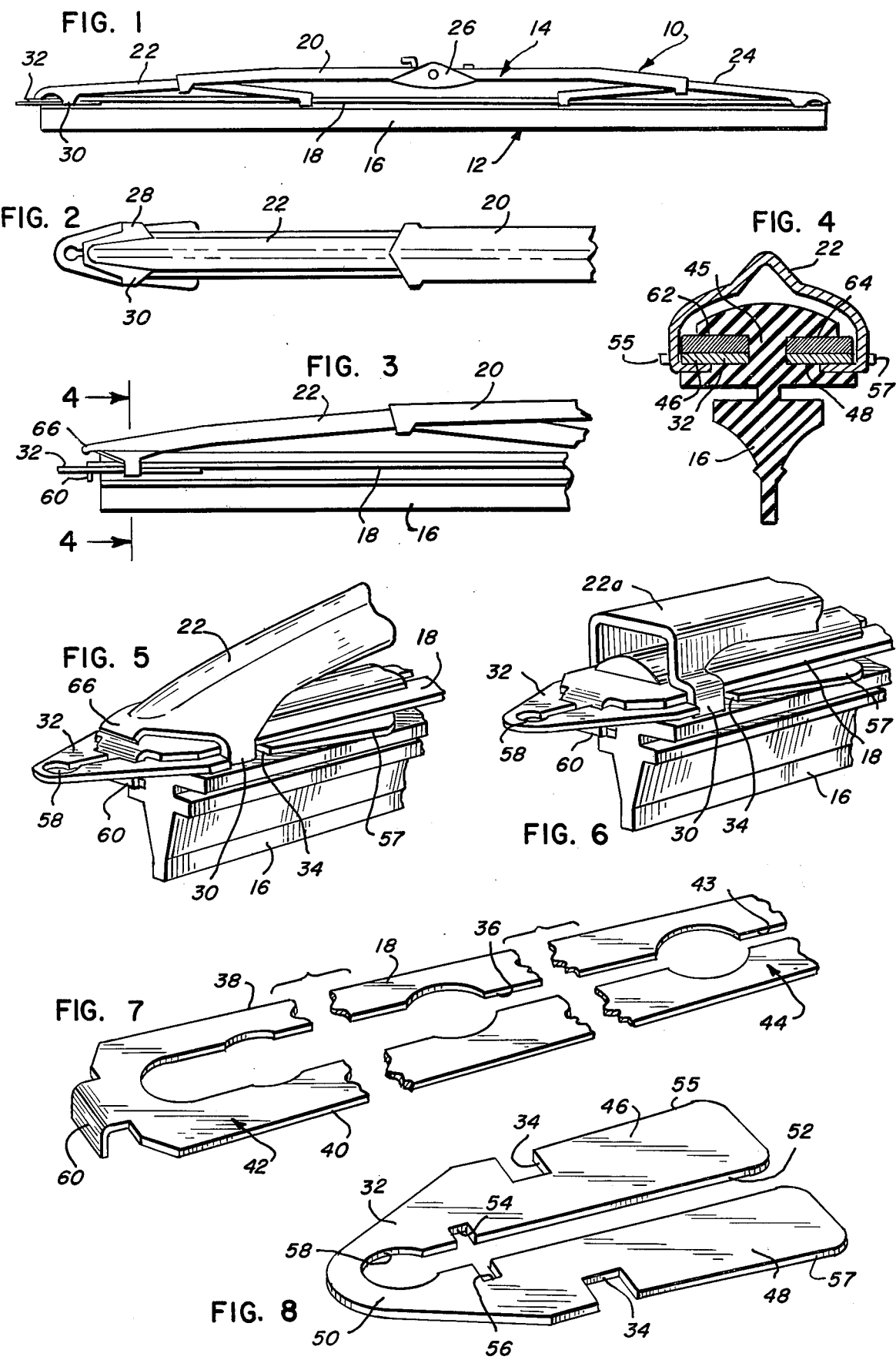

WINDSHIELD WIPER REFILL UNIT

BACKGROUND OF THE INVENTION

1. Field of the Invention

This invention relates to windshield wiper blades and, more particularly, to an improved backing strip or flexor for a refill unit for a wiper blade.

2. Description of the Prior Art

In the windshield wiper blade art and, in particular, the wiper blades that have been used almost exclusively for wiping both curved and flat windshields since the invention of John W. Anderson, covered by U.S. Pat. No. 2,596,063, issued on May 6, 1952, the wiper blade assembly has an articulated superstructure movably connected to the end of an oscillating windshield wiper arm. The superstructure has claws slidably connected at spaced apart points to a backing strip of a wiper blade refill unit. The claws of the superstructure engage with the edge of the backing strip so as to apply pressure at said spaced points to the backing strip and, therefore, to the rubber wiping element for cleaning the surface of the windshield as the wiper blade assembly is oscillated across the surface of the windshield.

The blade refil unit is adapted to be replaced when the wiping lip of the wiping element becomes worn or when the resilience of the wiping element decreases to a point that the quality of the wipe on the surface of the windshield is less than efficient. The backing strip for the blade refill unit, in some designs, has a slot running substantially the length of the backing strip which is adapted to bridge the hinge or web between the wiping portion of the wiping element and the bead or head of the wiping element so as to permit the wiping portion of the wiping element to hinge from side-to-side relative to the backing strip. Heretofore, the slot provided in the backing strip of certain designs is too wide, permitting the wiping element to become disengaged from the backing strip which destroys the usefulness of the wiper blade assembly. A design which has suffered from this deficiency is shown in the Scinta U.S. Pat. No. 2,687,544 and the Lenz et al. U.S. Pat. No. 3,153,254.

In addition, in some designs, the backing strip has not been wide enough so that the engagement with the claws of the superstructure is inadequate, resulting in the backing strip becoming disengaged frm the superstructure and, therefore, once again, causing the effectiveness of the wiper blade assembly to be destroyed. The above two cited patents, U.S. Pat. Nos. 3,153,254 and 2,687,544, both suffer from this same dificiency.

In order to hold the wiper refill unit assembled with the superstructure, end clips have been provided, such as is shown by the Lenz et al U.S. Pat. No. 3,153,254, the DePew U.S. Pat. No. 2,983,945 and the Roberts U.S. Pat. No. 3,707,741. Each of the end clips shown in the three mentioned patents have upturned tabs for holding the end clip assembled with the backing strip and have finger engaging portions for providing a purchase for depressing the sides of the end clip so as to facilitate removal of the superstructure from the wiper refill unit.

The wiper refill units of the types of blades just described, have an occasion resulted in scratched windshields due to the rubber wiping element escaping from the backing strip where the slot in the backing strip was too wide. The scratching has also been caused by failure to provide adequate width to the backing strip so that the claws of the superstructure became diengaged from th side edges of the backing strip. Lastly, the end clip could become disengaged from the backing strip whereupon the refil unit separate from the superstructure, resulting in scratching of the windshield.

SUMMARY OF THE INVENTION

To overcome the above described problems, we have invented an improved wiper refill unit which has a backing strip with a narrower slot throughout a portion thereof to provide a more positive engagement with the rubber wiping element thereby eliminating escape of the rubber wiping element from the backing strip. In addition, we have provided for a greater width to a portion of the backing strip so as to provide a more positive connection with the claws of the superstructure thereby preventing the claws from becoming disengaged from the backing strip. We have also provided an end clip that is planar in configuration and has an opening at the base of the U-shaped cross section into which opening a downturned tab on the backing strip engages so as to positively latch the end clip to the backing strip. The end clip, when used with the refill unit and assembled with a superstructure, has means for positively engaging one pair of outboard claws of the superstructure to hold the superstructure assembled on the wiper refill unit. By depressing the enlarged portions of the end clip, the means for engaging the outboard claws of the superstructure are depressed thereby releasing the claws so that the wiper refill unit can be removed from the superstructure.

The result of the three improved structural elements of the wiper refill unit is an improved wiper blade assembly which, when used with the particularly designed superstructure, is effective in use, positive in operation and substantially trouble-free to the driver of the vehicle.

BRIEF DESCRIPTION OF THE DRAWINGS

The details of construction and operation of the invention are more fully described with reference to the accompanying drawings which form a part thereof and in which like reference numerals refer to like parts throughout.

In the drawings:

FIG. 1 is a side view of a portion of a windshield wiper arm connected to a pressure-distributing superstructure which in turn is secured to a windshield wiper refill unit embodying a preferred form of our invention;

FIG. 2 is an enlarged top view of one end portion of the wiper blade assembly of FIG. 1;

FIG. 3 is an enlarged, broken away side view of the one end portion of the wiper blade assembly;

FIG. 4 is a cross-sectional view taken along the lines 4—4 of FIG. 3;

FIG. 5 is a perspective view of one end portion of the wiper blade assembly showing the outboard claws of the superstructure engaged with the refill unit having the improved end clip thereon;

FIG. 6 is a perspective view, similar to FIG. 5, only illustrating a different form of superstructure assembled with the wiper refill unit;

FIG. 7 is a perspective view, broken away in parts, of the backing strip of the wiper refill unit; and FIG. 8 is a perspective view of the planar end clip shown disassembled from the wiper refill unit.

DESCRIPTION OF THE PREFERRED EMBODIMENT

The windshield wiper blade assembly 10, as exemplified in the drawings, comprises a wiper refill unit 12 and a pressure-distributing articulated superstructure 14. The wiper refill unit 12 has a resilient wiping element 16 and a flexible backing strip or flexor 18. The articulated pressure-distributing superstructure 14 comprises a primary yoke 20 and a pair of secondary yokes 22 and 24 pivotally connected to the opposite ends thereof. Superstructure 14 also includes a connector 26, centrally disposed with respect to the primary yoke 20 and includes a means for connecting the wiper blade to the end of a windshield wiper arm (not shown). The opposite ends of the secondary yokes 22 and 24 have pairs of inwardly directed claws 28 and 30 which are adapted to engage around the outer edge portions of the backing strip 18. To hold the wiper refill unit 12 assembled with respect to the superstructure 14, a spring clip 32 is provided on one end portion of the wiper refill unit and has notches 34 in which the outboard pair of claws 28,30 of the one secondary yoke 22 are seated so as to hold the superstructure assembled on the wiper refill unit 12.

As shown in FIG. 7, the flexor or backing strip 18 has a slot 36 running longitudinally the full length of the backing strip. The outboard edges 38,40 of the backing strip lie substantially parallel to each other throughout the length of the backing strip. The slot 36 converges from a normal width at the outer end portions 42 thereof to a relatively narrow slot near the center portion 44 of said backing strip. The backing strip 18 is assembled with a wiping element by threading the wiping element into the slot 36 in the backing strip 18 such that the walls 43 of the narrower portion of the slot near the center portion 44 of the strip will bear against the web 45 of the wiping element 16. The web 45 will urge the sides of the backing strip 18 near the center portion 44 outward a short distance so as to produce a wider backing strip in the midportion 44 thereof. At the same time, the flexor 18 bears harder against the web 45 of the wiping element 16 so that the chance of element 16 pulling out of the backing strip is greatly reduced. With the side portions of the backing strip 18 forced farther out in the central portion 44 of the wiping element, the inboard pairs of clws 28,30 of the secondary yokes 22 and 24 are seated with a greater contact area around the outer edges 38,40 of the backing strip 18 thereby reducing the possibility of the backing strip becoming disengaged from the claws.

The retaining clip 32, as shown separately in FIG. 8, is a planar element having a U-shape in cross section with a pair of side portions or legs 46,48 joined together by the base of the "U" or hinge member 50. Between the legs 46 and 48, there is a slot 52 which is interrupted near the base of the U-shaped clip by a pair of outwardly formed notches 54,56 in alignment with each other and lying substantially transverse to the center line of the clip. the slot 52 is enlarged at the blind end portion 58 so as to provide the proper degree of resilience to the hinge between the two legs of the clip. The outer edges 55,57 of the legs 46,48 have aligned notches 34 formed therein. The notches 34 are inboard from the notches 54,56.

A downturned tab 60 is formed on at least one end portion 42 of the backing strip 18 and is adapted to nest in the notches 54,56 in the end or spring clip 32 whereupon the juxtaposed clip and backing strip 18 are assembled in the grooves of the wiping element. If the backing strip 18 is already assembled with the wiping element 16, the end clip may be slid between the backing strip 18 and the bottom wall of the sidewardly facing grooves 62,64 of the wiping element 16 to deflect the bottom wall until the tab 60 aligns with and drops into the notches 54,56. The end clip 32, when thus assembles with the wiping element 16 and backing strip 18, combines to form the wiper refill unit 12.

To assemble a superstructure 14 to the wiper refill unit 12, the claws 28,30 of the secondary yokes are threaded around the outer edges 38,40 of the backing strip 18 until the outboard claws 28 and 30 of the one secondary yoke 22 abuts against the ends of the side legs 46,48 of the clip 32. The legs 46,48 are depressed against the web 45 of the wiping element 16 until the claws 28 and 30 pass around the outer corners of the clip whereupon the superstructure 14 is moved relative to the refill unit 12 until the claws 28 and 30 align with and seat in the notches 34 in the legs 46,48 of the clip 32.

To disengage the superstructure 14 from the wiper refill unit 12, the side edges 55,57 of the end clip 32 are urged toward each other to deflect the side legs 46,48 toward each other until the claws 28,30 of the superstructure 14 disengage from the notches 34 in the end clip 32 whereupon the superstructure 14 is slid relative to the wiper refill unit 12 for disassembly.

FIG. 5 shows one type of superstructure where the secondary yoke 22 is rounded and terminates with a downturned ridge 66. The ridges 66 will somewhat overlap the ends of the bead on the wiping element 16. FIG. 6 shows another type of superstructure where the secondary yoke 22a is square on the end and stands up, away from the bead of the wiping element. The wiper refill unit 12 of our invention is intended for use with most known superstructures.

We claim:

1. A windshield wiper blade having an articulated superstructure, a wiper refill unit, means on said superstructure for slidably engaging said wiper refill unit, said wiper refill unit having a resilient wiping element and a backing strip, said wiping element having a pair of oppositely facing grooves separated by a web, said backing strip having a slot extending lengthwise thereof with the end portions of said slot having a width substantially equal to the width of said web in the wiping element, the width of said slot tapering toward the midportion of the backing strip so that said slot is narrower at the midportion than at said end portions, said backing strip being seated in said grooves in said wiping element with said web nesting in said slot, the walls of said narrower portion of the slot in the backing strip compacting the midportion of said web in said wiping element, said backing strip having spaced apart outer edges with each outer edge lying in a plane, and said web urging said midportion of the backing strip outward so that the outer edges of the backing strip at said midportion project outward beyond said planes of said outer edges, and seat in said means on said superstructure.

2. A windshield wiper refill unit having a resilient wiping element and a backing strip, said wiping element having a back portion with a pair of oppositely facing grooves separated by a web, said backing strip having a slot extending lengthwise thereof with the end portions of said slot having a width substantially equal to the width of said web in the wiping element, the width of said slot tapering toward the midportion of the backing strip so that said slot is narrower at the midportion than at said end portion, said backing strip having spaced apart outer edges with each outer edge lying in a plane, said backing strip being seated in said grooves in said wiping element with said web nesting in said slot, the walls of said narrower portion of the slot in the backing strip compacting the midportion of said web in said wiping element, said web urging said midportion of the backing strip outward so that the outer edges of the backing strip at said midportion project outward beyond said planes of said outer edges, an end clip having a planar body portion divided into two legs joined together by a hinge member, notches in the outer edges of said legs, each leg of the clip gradually increasing in width beyond said notches, notches in the inner edges of said legs, and a downturned tab on the end of said backing strip extending into said notches in the inner edges of said legs when said end clip and said backing strip are juxtaposed and nested in said oppositely facing grooves whereby said increased width of each leg extends outward beyond the outer edges of said backing strip.

* * * * *

UNITED STATES PATENT AND TRADEMARK OFFICE
CERTIFICATE OF CORRECTION

PATENT NO. : 4,075,731

DATED : February 28, 1978

INVENTOR(S) : William H. Harbison, Michael G. Mohnach and John J. Plisky

It is certified that error appears in the above-identified patent and that said Letters Patent are hereby corrected as shown below:

Column 1, line 47, "frm" should be --from--;

line 64, "an" should be --on--.

Column 2, line 1, "diengaged" should be --disengaged--;

line 4, "refil" should be --refill-- and "separate" should be --separated--.

Column 3, line 46, "clws" should be --claws--;

line 59, "the" (second occurrence) should be --The--.

Column 4, line 7, "assembles" should be --assembled--.

Column 6, line 2, "gradially" should be --gradually--.

Signed and Sealed this

Eighteenth Day of July 1978

[SEAL]

Attest:

RUTH C. MASON
Attesting Officer

DONALD W. BANNER
Commissioner of Patents and Trademarks